US008909384B1

(12) United States Patent
Beitelmal et al.

(10) Patent No.: US 8,909,384 B1
(45) Date of Patent: Dec. 9, 2014

(54) COMPUTING APPARATUS OPERABLE UNDER MULTIPLE OPERATIONAL POLICIES

(75) Inventors: Abdlmonem H. Beitelmal, Los Altos, CA (US); Chandrakant D. Patel, Fremont, CA (US); Mehrban Jam, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1878 days.

(21) Appl. No.: 11/845,231

(22) Filed: Aug. 27, 2007

(51) Int. Cl.
*G05D 23/00* (2006.01)

(52) U.S. Cl.
USPC .............................. 700/300; 700/19; 713/320

(58) Field of Classification Search
USPC .............. 700/19, 89, 276, 299, 300; 713/300, 713/320, 323
See application file for complete search history.

(56) References Cited

U.S. PATENT DOCUMENTS

| 6,609,204 | B1 * | 8/2003 | Olarig et al. ..................... 726/35 |
| 7,412,306 | B2 * | 8/2008 | Katoh et al. ................... 700/299 |
| 2005/0049729 | A1 * | 3/2005 | Culbert et al. ................... 700/50 |
| 2006/0178764 | A1 * | 8/2006 | Bieswanger et al. ........... 700/89 |
| 2006/0214014 | A1 * | 9/2006 | Bash et al. ..................... 236/1 B |
| 2007/0100494 | A1 * | 5/2007 | Patel et al. ..................... 700/190 |
| 2009/0015241 | A1 * | 1/2009 | Gross et al. ................... 324/166 |

* cited by examiner

*Primary Examiner* — Sean Shechtman
*Assistant Examiner* — Steven Garland

(57) ABSTRACT

A computing apparatus is configured to operate under multiple operational policies. In a method for controlling the computing apparatus, a plurality of sensors are correlated with a plurality of actuators. An operational policy of the multiple operational policies is selected to implement and input from the plurality of sensors is received. The inputs are analyzed to identify at least one of the plurality of actuators to be manipulated based upon the correlation and the selected operational policy to implement. In addition, at least one of the identified plurality of actuators is manipulated based upon the selected operational policy.

19 Claims, 11 Drawing Sheets

COMPUTING APPARATUS OPERABLE UNDER MULTIPLE OPERATIONAL POLICIES

BACKGROUND

Ever increasing power densities and ever decreasing sizes of today's computer systems produce new challenges in properly cooling the computer systems. Current approaches to cooling the computer systems include linking an actuator or a group of actuators with a set of sensors. For instance, commercial notebook computers are known to use a fan and a sensor. The sensor is typically a digital thermal sensor (DTS) embedded into the CPU die.

Under this configuration, the sensor relays sensed data to a thermal control chip, which controls the speed on the fan based on a predetermined threshold. The fan speed and air flow relationship is typically available in a lookup table and the sensor triggers the fan on or off, or based on discrete steps (20%, 50%, 100%). In this regard, control over the fan is based solely on the temperature detected by the sensor. This cooling of the computer systems under current approaches is therefore reactive to the detected conditions in the computer systems. As such, current cooling approaches are relatively inflexible and do not afford users with the ability to tailor how they use the computer systems.

BRIEF DESCRIPTION OF THE DRAWINGS

Features of the present invention will become apparent to those skilled in the art from the following description with reference to the figures, in which.

DETAILED DESCRIPTION OF THE INVENTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a method for controlling a computing apparatus configured to operate under multiple operational policies, and a computing apparatus configured to perform the method. The multiple operational policies include a thermal management policy, an energy optimization policy, a performance policy, a sustainability policy, and a warranty and maintenance policy. Each of the operational policies has its own objectives and thus, a user or the computing apparatus may select one or more of the operational policies to implement to meet those objectives. Thus, for instance, the computing apparatus may be operated with a greater level of flexibility as compared with conventional computing apparatuses.

Figure 1:
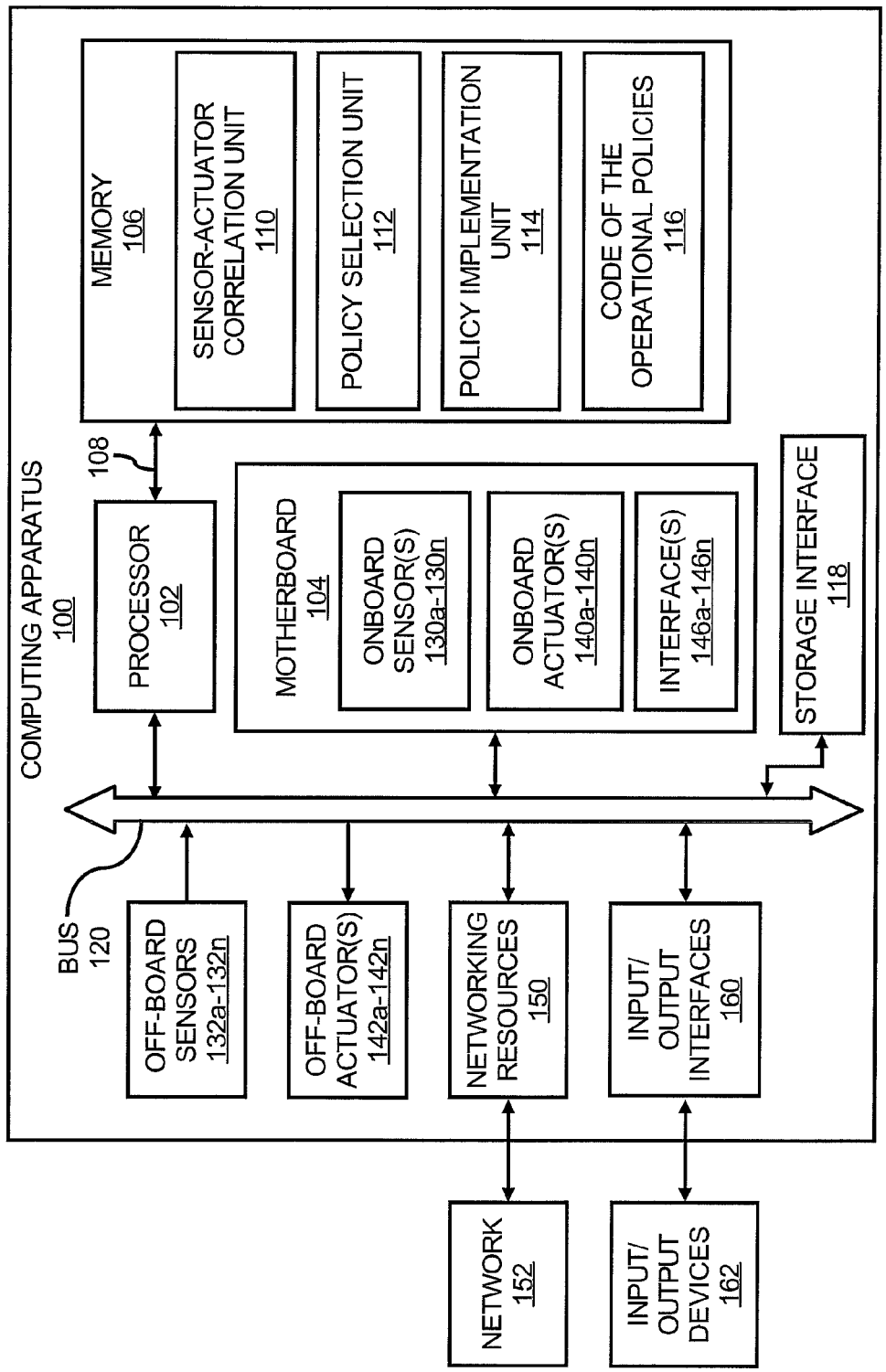
FIG. 1 shows a simplified block diagram of a computing apparatus configured to operate under multiple operational policies, according to an embodiment of the invention.

With reference first to FIG. 1, there is shown a simplified block diagram of a computing apparatus 100 configured to operate under multiple operational policies. It should be understood that the computing apparatus 100 may include additional components and that some of the components described herein may be removed and/or modified without departing from the scope of the computing apparatus 100.

The computing apparatus 100 may generally comprise any reasonably suitable type of computing device, such as, a personal computer, a laptop computer, a server, an imaging machine, a printing machine, etc. In addition, the computing apparatus 100 may also comprise a substantially specialized computing device, such as, a personal computer or a laptop computer specially configured to enhance video game play. The computing apparatus 100 may also include components that generate relatively high levels of heat, such as, high powered graphics and other types of chips, processors, disk drives, monitors, etc. In order to adequately cool these high-heat generating components, the computing apparatus 100 may also include a relatively high powered cooling system that includes, for instance, a high-capacity fan or blower, a liquid or refrigerant cooling system, etc.

The computing apparatus 100 includes a processor 102 and a motherboard 104. According to an example, the processor 102 comprises the main central processing unit (CPU) of the motherboard 104. According to another example, the processor 102 comprises a separate processing device from the CPU of the motherboard 104. The costs associated with producing the motherboard 104 and the processor 102 in the first example are relatively lower than in the second example. In addition, the first example enables greater flexibility in updating the programs executed by the processor 102. However, by separating out the processor 102 from the motherboard 104 as in the second example, the processor 102 may be operating system agnostic and may have greater reliability since it may continue to operate if the CPU or the OS running on the CPU fails.

In any regard, the processor 102 may perform a number of processing functions in the computing apparatus 100. One of the processor 102 functions is to operate the computing apparatus 100 according to one or more operational policies, where each of the operational policies has a different objective with respect to the computing apparatus 101 operations.

The operational policies may include a thermal management policy, an energy optimization policy, a performance policy, a sustainability policy, a warranty and maintenance policy, etc. An objective of the thermal management policy is to substantially ensure that the heat generating components, such as, processors, graphics chips, etc., receive, for instance, recommended levels of cooling provisioning. An objective of the energy optimization policy is to substantially minimize the energy consumption levels of the cooling system components, such as a fan, a compressor, a pump, etc., while maintaining the temperatures of the heat generating components below a pre-specified threshold.

An objective of the performance policy is to enhance performance of the computing apparatus 100 components by, for instance, increasing the cooling provisioning supplied to the components regardless of the increased energy usage. The performance policy may be desired, for instance, when a relatively high level of performance is desired from the computing apparatus 100, such as, when the computing apparatus 100 is employed for video game play or for other high-resolution or graphics intensive programs (like 3D rendering programs).

An objective of the sustainability policy is to substantially predict and prevent failures of the computing apparatus 100 components. An objective of the warranty and maintenance policy is to reduce costs associated with providing warranties and maintenance for the computing apparatus 100 by tracking sensor data that will assist in trouble-shooting and identifying the cause of most problems that occur in the computing apparatus 100.

In instances where the processor 102 is configured to implement a plurality of the operational policies simultaneously, the processor 102 may implement the energy optimization policy is to substantially optimize the objectives of the plurality of operational policies.

Based upon the selected one or more operational policies, as well as inputs received from one or more sensors, the processor 102 may also function to control or otherwise manipulate one or more actuators in an effort to achieve the objectives of the one or more selected operational policies. Various functions that the processor 102 performs are described in greater detail herein below.

Initially, however, the processor 102 may comprise a microprocessor, a micro-controller, an application specific integrated circuit (ASIC), and the like, configured to perform the functions discussed above. The processor 102 is illustrated as being in communication with a memory 106 through a memory bus 108. However, in various instances, the memory 106 may form part of the processor 102 without departing from a scope of the computing apparatus 100.

Generally speaking, the memory 106 provides storage of software, programs, algorithms, and the like, that provide some or all of the processor 102 functionalities. By way of example, the memory 106 stores an operating system, application programs, program data, and the like, and may be implemented as a combination of volatile and non-volatile memory, such as DRAM, EEPROM, MRAM, flash memory, and the like. In addition, or alternatively, the memory 106 may comprise a device configured to read from and write to a removable media, such as, a floppy disk, a CD-ROM, a DVD-ROM, or other optical or magnetic media.

The memory 106 is depicted as including a sensor-actuator correlation unit 110, a policy selection unit 112, a policy implementation unit 114, and code of the operational policies 116. The units 110-114 may comprise software modules or hardware modules that the processor 102 may invoke or otherwise implement in performing the various functions described therein. In addition, the processor 102 may execute the code of the operational policies 116 to control the computing apparatus 100 in an effort to achieve the one or more selected operational policies. In any regard, the units 110-114 and the code of the operational policies 116 may comprise code stored on a computer readable medium, such as, a removable storage device, and may thus comprise one or more separate components from the computing apparatus 100.

The computing apparatus 100 is also depicted as including a storage interface 118, which generally enables external access to the data stored in the memory 106. In this regard, the storage interface 118 may include a USB interface that enables a bus-powered USB storage device to access the memory 106.

As also shown in FIG. 1, the computing apparatus 100 includes a bus 120 through which the processor 102 may communicate with the motherboard 104. More particularly, the processor 102 may communicate with the motherboard 104 to receive input from onboard sensors 130a-130n of the motherboard 104 and to communicate instructions to onboard actuators 140a-140n of the motherboard 104. The onboard sensors 130a-130n may include, for instance, CPU temperature sensors, temperature sensors positioned to detect various thermal zones on the motherboard 104, etc. The onboard actuators 140a-140n may include, for instance, a CPU fan.

The processor 102 may communicate with various other components in the computing apparatus 100 over the bus 120. The various other components include off-board sensors 132a-132n and off-board actuators 142a-142n, which are both separate from the motherboard 104. The off-board sensors 132a-132n may include, for instance, sensors configured to detect intake and outlet temperatures, sensors configured to detect acoustic conditions, vibration, tilt, etc. The off-board actuators 142a-142n may include a liquid-loop pump of a cooling system, a fan or blower of the computing apparatus 100, etc.

The sensors 130a-130n and 132a-132n may include other types of sensors, such as, IC diodes, thermocouples, resistance temperature detectors, thermistors, accelerometers, voltmeters, ammeters, etc. The actuators 140a-140n and 142a-142n may also include other types of actuators, such as, power supply fans, system fans, graphics card fans, heat exchanger fans, pumps, etc.

The processor 102 may communicate with a networking resources interface 150 and input/output interfaces 160 over the bus 120. The processor 102 may be configured to communicate with one or more other computing device over a network 152, such as, an intranet, the Internet, etc., interfaced through the networking resources interface 150. In addition, the processor 102 may receive signals from and send signals to one or more input devices and output devices 162 through the input/output interfaces 160. The input devices may include a keyboard, a mouse, a display, removable memories, etc. In addition, the output devices may include displays, removable memories, etc.

Figure 2:
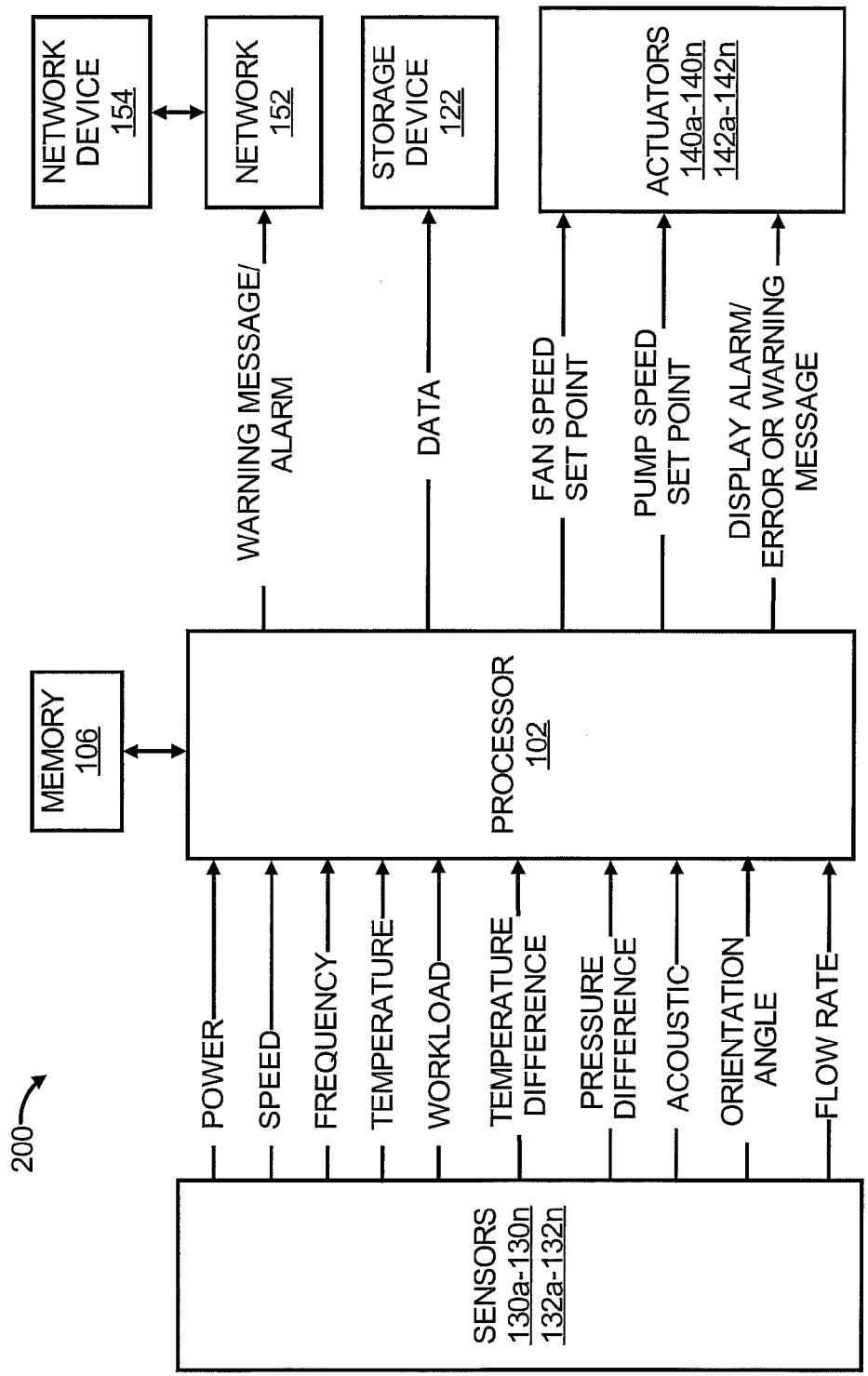
FIG. 2 shows a schematic diagram depicting a control process of the computing apparatus depicted in FIG. 1, according to another embodiment of the invention.

Turning now to FIG. 2, there is shown a schematic diagram depicting a control process 200 of the computing apparatus 100 depicted in FIG. 1, according to an example. It should be apparent to those of ordinary skill in the art that the control process 200 represents a generalized illustration and that other steps may be added or existing steps may be removed, modified or rearranged without departing from a scope of the method 200.

As shown in FIG. 2, the processor 102 receives a plurality of inputs from the sensors 130a-130n, 132a-132n. The inputs include various sensed data, such as, power consumption levels of the processor 102 or other components, speeds at which the processor 102 is running, frequencies at which one or more fans are rotating, temperatures measured at one or more locations in the computing apparatus 100, workloads performed by the processor 102 or other components, temperature differences between various sections in the computing apparatus 100, pressure levels or differences between various sections in the computing apparatus 100, acoustic noise levels, orientation angle of the computing apparatus 100 or its components, rates at which airflow is supplied through the computing apparatus 100, etc.

Figure 3:
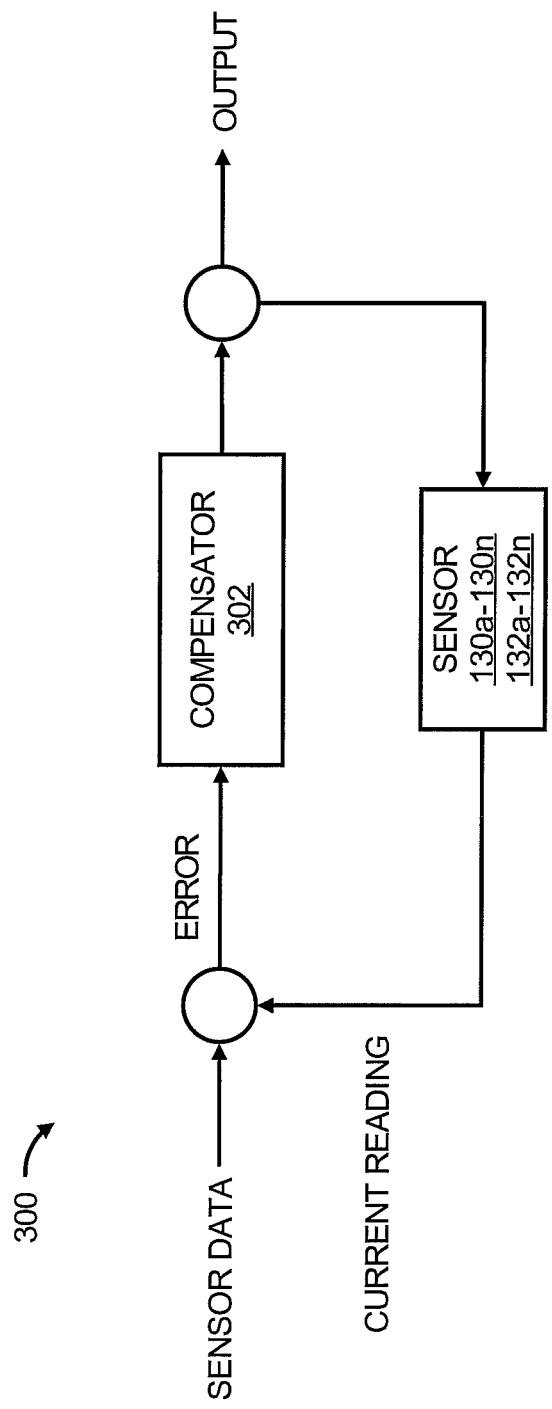
FIG. 3 shows a diagram of a PID controller, according to an embodiment of the invention.

The processor 102 analyzes the received inputs against the operational policies stored in the memory 106 in identifying at least one of the plurality of actuators 140a-140n, 142a-142n to manipulate in an effort to achieve objectives of the one or more operational policies. In making these determinations, the processor 102 may be implemented as a proportional, integral, derivative (PID) controller as shown in the diagram 300 in FIG. 3, in which sensor data is put through a compensator 302 to obtain an output. The output may comprise various types of outputs, such as, transmission of a warning message or alarm to a network device 154, such as, an operator's computer, over the network 152, transmission of the received data for storage in a storage device, transmission of a new fan speed set point, transmission of a new pump speed set point, transmission of a signal to display an alarm, error or warning message, etc.

Figure 4:
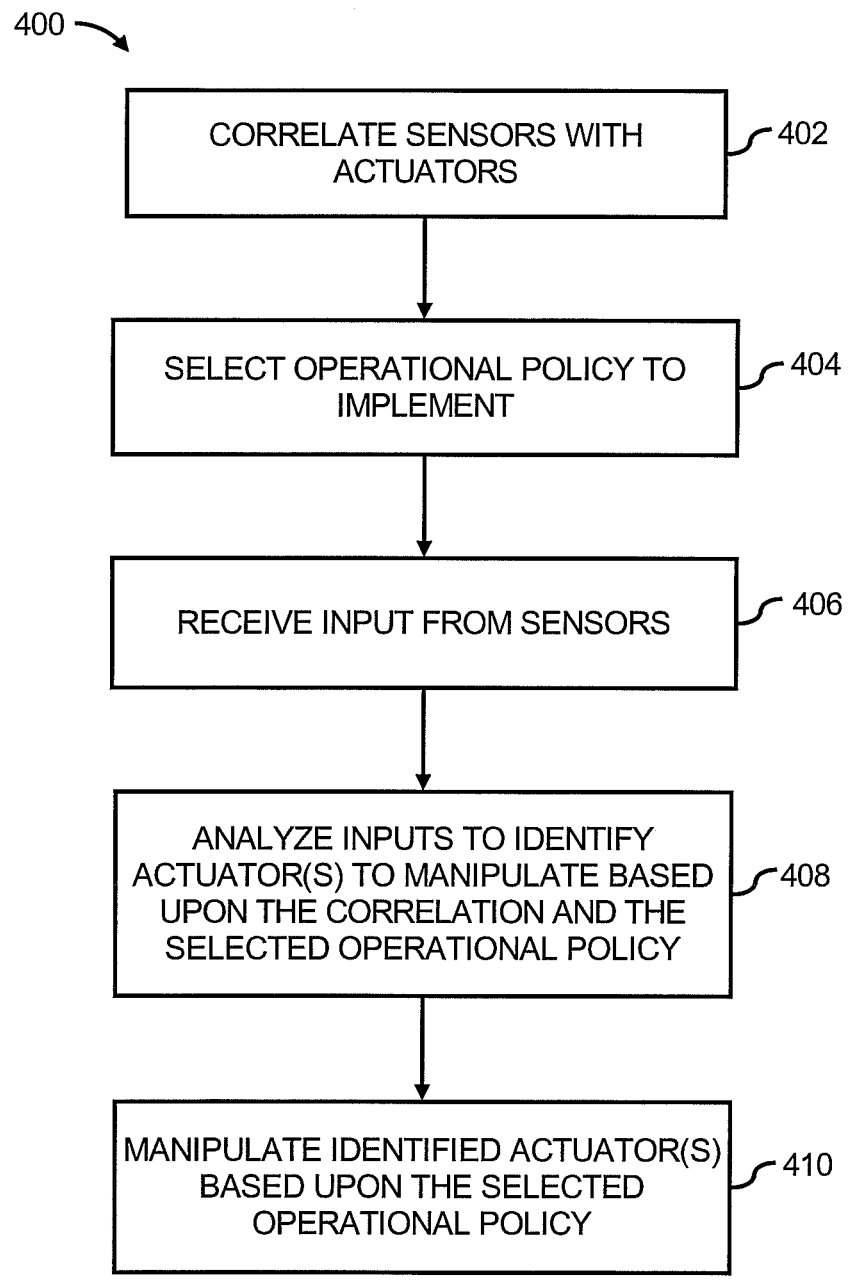
FIG. 4 depicts a flow diagram of a method for controlling a computing apparatus having a plurality of sensors and a plurality of actuators, in which the computing apparatus is configured to operate under multiple operational policies, according to an embodiment of the invention.

Various operations performed by the processor 102 will be described in greater detail with respect to FIG. 4, which depicts a flow diagram of a method 400 for controlling a computing apparatus 100 having a plurality of sensors 130a-130n, 132a-132n and a plurality of actuators 140a-140n, 142a-142n, in which the computing apparatus 100 is configured to operate under multiple operational policies, according to an example. It should be apparent to those of ordinary skill in the art that the method 400 represents a generalized illustration and that other steps may be added or existing steps may be removed, modified or rearranged without departing from a scope of the method 400.

The description of the method 400 is made with reference to the computing apparatus 100 illustrated in FIG. 1, and thus makes reference to the elements cited therein. It should, however, be understood that the method 400 is not limited to the elements set forth in the computing apparatus 100. Instead, it should be understood that the method 400 may be practiced by a computing apparatus having a different configuration than that set forth in the computing apparatus 100 depicted in FIG. 1.

Generally speaking, the processor 102 may implement the method 400 to determine how one or more actuators 140a-140n, 142a-142n are to be manipulated in an effort to achieve the objectives defined by one or more of the operational policies. As discussed above, the operational policies may include a thermal management policy, an energy optimization policy, a performance policy, a sustainability policy, a warranty and maintenance policy, etc., in which each of the policies has a different objective. The different objectives may range from maintaining reliability to increasing performance and optimizing energy efficiency.

At step 402, the processor 102 may invoke or implement the sensor-actuator correlation unit 110 to correlate the sensors 130a-130n, 132a-132n with the actuators 140a-140n, 142a-142n to determine, for instance, the level of influence each of the actuators 140a-140n, 142a-142n has over each of the sensors 130a-130n, 132a-132n. According to an example, the relationship between the values of the sensors 130a-130n, 132a-132n and the actions of the actuators 140a-140n, 142a-142n may be represented mathematically as follows:

$$S_{sensor} = (S_1, S_2, S_3, \ldots, S). \qquad \text{Equation (1)}$$

$$A_{act} = (A_1, A_2, A_3, \ldots, A_n). \qquad \text{Equation (2)}$$

In Equation (1), S is the sensor value (temperature, humidity, etc.) and in Equation (2), A is the actuator action (speed, flow, etc.).

In addition, each of the sensors 130a-130n, 132a-132n may be represented by the following equation:

$$S_1 = f_1(A_1, A_2, A_3, \ldots, A_n)$$

$$S_2 = f_2(A_1, A_2, A_3, \ldots, A_n).$$

$$S_m = f_m(A_1, A_2, A_3, \ldots, A_n) \qquad \text{Equation (3)}$$

Equation (3) indicates that each of the sensor values is dependent upon the values of the actuator actions based on some function $f$. The values of the sensors 130a-130n, 132a-132n need not be dependent upon all of the actuators 140a-140n, 142a-142n, but will be dependent on at least one of the actuators 140a-140n, 142a-142n. By way of example, the functions $f_1, f_2, \ldots, f_m$ may be linear, polynomial, or any other function depending upon the system configuration.

If the relationship between the sensor values and the actuators is linear, Equation (3) may be written in matrix form as:

$$[S] = [C][A]. \qquad \text{Equation (4)}$$

In Equation (4), [S] is an m×1 sensors matrix, [C] is an m×n coefficient matrix, and [A] is an n×1 actuators matrix. The processor 102 may perform matrix analyses to understand the relationship between the sensors 130a-130n, 132a-132n and the actuators 140a-140n, 142a-142n. According to an example, the processor 102 may predetermine the relationships between the sensors 130a-130n, 132a-132n and the actuators 140a-140n, 142a-142n and may enter the coefficients during an initial setup provided that the initial setup does not change. However, if components have been removed or added following, the initial setup, a new commissioning process will be required to update the relationships between the sensors 130a-130n, 132a-132n and the actuators 140a-140n, 142a-142n.

The sensitivity of the sensors 130a-130n, 132a-132n to each of the actuators 140a-140n, 142a-142n may be determined the k factor shown below. The k factor is obtained by taking the partial derivative of the sensor with respect to the actuator in question as follows:

$$\partial S_1 / \partial A_1 = k. \qquad \text{Equation (5)}$$

In Equation (5), the magnitude of the k factor will determine how sensitive $S_1$ is to any changes in $A_1$ relative to the rest of the sensor value changes, where a large value of the k factor relative to the rest of the factors indicates that the sensitivity is high and a smaller value of the k factor indicates that the sensitivity is low. This information may be used to determine which actuator has a dominant effect over which zone. In addition, the sign of the k factor will identify whether the sensor value is increasing or decreasing with increasing actuator value.

As another example, eigenvalues and eigenspaces may be employed to determine the dependency between two or sets of sensors 130a-130n, 132a-132n, such as, which set of sensors 130a-130n, 132a-132n is more dominant in control and which is redundant. The scalar λ is called eigenvalue, such that:

Equation (6): $[C][x] = [\lambda][x]$ has a non-zero solution. λ is called an eigenvalue of C an any non-zero vector x satisfying the above equation is called an eigenvector corresponding to λ. Eigenspace is a set of eigenvectors with common eigenvalues. The equation to solve is:

$$(\lambda I - C)x = 0. \quad \text{Equation (7)}$$

Equation (7) will have a non-trivial solution if and only if (λI-C) is not invertible. The solution of Equation (7) identifies the behavior of the matrix and determines which of the sensors or the sets of sensors dominates. The matrix [C] is the coefficients matrix for the sensors within the computing apparatus 100.

In addition to correlating the sensors 130a-130n, 132a-132n with the actuators 140a-140n, 142a-142n at step 402, the processor 102 may also determine higher level relationships. In the following discussion, the computing apparatus 100 is considered to have n number of sensors 130a-130n, 132a-132n and m number of actuators 140a-140n, 142a-142n.

In one example, the processor 102 may identify various zones of influence in the computing apparatus 100 over which one or more particular actuators 140a-140n, 142a-142n have influence. In this example, the processor 102 may determine which actuator 140a-140n, 142a-142n has control over which sensor 130a-130n, 132a-132n based upon the respective zones of influence. This relationship may be determined during a commissioning process in which the sensor data indicates the interdependency between the sensors 130a-130n, 132a-132n and any particular actuator. Once the zone of influence for each actuator 140a-140n, 142a-142n has been determined, the processor 102 may control the actuators 140a-140n, 142a-142n based upon one or more operational policies as discussed in greater detail herein below.

By way of example, the relationship between temperature sensors 130a-130n, 132a-132n and cooling actuators 140a-140n, 142a-142n may be described as follows:

$$(T_1, T_2, T_3, \ldots, T_m) = f(A_1, A_2, A_3, \ldots, A_n). \quad \text{Equation (8)}$$

In Equation (8), T is temperature and A is actuator speed. In addition, n and m do not have to be equal. Each of the temperatures may be represented by the following equation:

$$T_1 = f_1(A_1, A_2, A_3, \ldots, A_n)$$

$$T_2 = f_2(A_1, A_2, A_3, \ldots, A_n),$$

$$T_m = f_m(A_1, A_2, A_3, \ldots, A_n) \quad \text{Equation (9)}$$

which may be written in matrix form as:

$$[T] = [C][A]. \quad \text{Equation (10)}$$

In Equation (10), [T] is an m×1 matrix, [C] is an m×n coefficient matrix, and [A] is an n×1 actuators matrix. As discussed above, the processor 102 may perform a sensitivity analysis on the matrix of Equation (10) to determine the effect of actuator perturbation on the sensor values by taking the partial derivative of each temperature with respect to the actuator and evaluating the k factor as follows:

$$\partial S_i / \partial A_j = k_{ii}. \quad \text{Equation (11)}$$

In Equation (11), i=1, ..., m, j=1, ..., n, and ii=1, ..., r.

In another example, the processor 102 may control one or more of the actuators 140a-140n, 142a-142n to maintain the sensor values below a maximum allowable temperature by minimizing temperature differential between an optimum value and current values. The level of difference between the values is determined by δ.

Equation (12): $|[S_{current} - S_{opt}]| < [\delta]$, where the absolute value is bounded by δ. In Equation (12), $S_{current}$ is the current sensor readings, $S_{opt}$ is the optimum sensor value and δ is the allowable deviation.

Substituting into Equation (12), $$|[C][A] - [S_{opt}]| < [\delta],$$

$$|[C][A] < [S_{opt}]| + [\delta],$$

$$[S_{opt}] + [\delta] > [C][A] > [S_{opt}] - [\delta] \quad \text{Equation (13)}$$

Using the inversion of the matrix [C], the above equation may be rewritten for optimum actuator settings as follows:

$$[C]^{-1}[[S_{opt}] + [\delta]] > [A_{opt}] > [C]^{-1}[[S_{opt}] - [\delta]], \text{ where}$$
$$[A_{opt}] \text{ is non-singular and } \delta \neq 0. \quad \text{Equation (14)}$$

The processor 102 may implement Equation (14) for steady state values, that is, for a given sensor value there exists an optimum actuator value. However, for transient analysis, the processor 102 requires input from transient sensors and their time constant for various actuator value perturbations. In this case, the proper amount of decrease or increase in actuator values is determined to reach optimum sensor values.

As a yet further example, the processor 102 may measure power input into the computing apparatus 100 to calculate the air flow rate required based on the following equation:

$$\text{Air mass flow rate} = Q(\text{measured}) / C_p (T_{outlet} - T_{inlet}). \quad \text{Equation (15)}$$

In Equation (15), Q is heat and is measured in Watts, $C_p$ is a coefficient of performance and is measure in J/Kg-K, and T is temperature and is measured in K.

The air mass flow rate is the total value of all air actuators inside the system and thus:

$$\text{Air mass flow rate} = \Sigma(A_i). \quad \text{Equation (16)}$$

The processor 102 may compare the $\Sigma(A_i)$ with $\Sigma(A_{opt})$ and may select the smaller of the two in calculating the air mass flow rate through the computing apparatus 100.

After the processor 102 has correlated the sensors 130a-130n, 132a-132n with the actuators 140a-140n, 142a-142n in any of the manners discussed above, the processor 102 may store the correlations in the memory 106. In addition, at step 404, the processor 102 may invoke or implement the policy selection unit 112 to select one or more operational policies to implement.

According to a first example, the processor 102 may select the one or more operational policies to implement based upon input received from a user. In other words, a user may instruct the processor 102 to implement one or more of the operational policies. In this example, the user may identify a desired objective, such as, energy conservation or high performance, and the processor 102 may select one or more of the operational polices that are designed to meet that objective.

According to a second example, the processor 102 may automatically select the one or more operational policies based upon, for instance, the types of operations that the computing apparatus 100 is currently performing. For instance, if the computing apparatus 100 is being implemented for gaming, the processor 102 may select the performance policy. On the other hand, if the computing apparatus 100 is being implemented for less computationally-intensive operations, such as, word processing, the processor 102 may select the energy efficiency policy or the thermal management policy.

The processor 102 may select to implement multiple operational policies, such as the energy optimization policy and the sustainability policy.

At step 406, the processor 102 may receive input from the sensors 130a-130n, 132a-132n as discussed above. In addition, at step 408, the processor 102 may invoke or implement the policy implementation unit 114 to analyze the inputs to identify which of the one or more actuators 140a-140n, 142a-142n are to be manipulated based upon the correlation determined at step 402 and the one or more operational policies selected at step 404. More particularly, the processor 102 may analyze the inputs received from the sensors differently depending on which the operational policies has been selected to be performed.

In an example where the energy optimization policy has been selected, the processor 102 may attempt to maintain the speeds of the actuators 140a-140n, 142a-142n as low as possible while maintaining the computing apparatus 100 below a pre-specified threshold temperature to thereby optimize power consumption in the computing apparatus 100. The threshold temperature may be defined as the maximum safe operational temperature for the components in the computing apparatus 100.

In one regard, therefore, the processor 102 may also implement the thermal management policy in implementing the energy optimization policy to thereby ensure that the temperature of the computing apparatus 100 is maintained below a pre-specified threshold temperature. Two examples of the energy optimization policy are depicted in the flow diagrams of the methods 500 and 550 in FIGS. 5A and 5B.

Figure 5A:
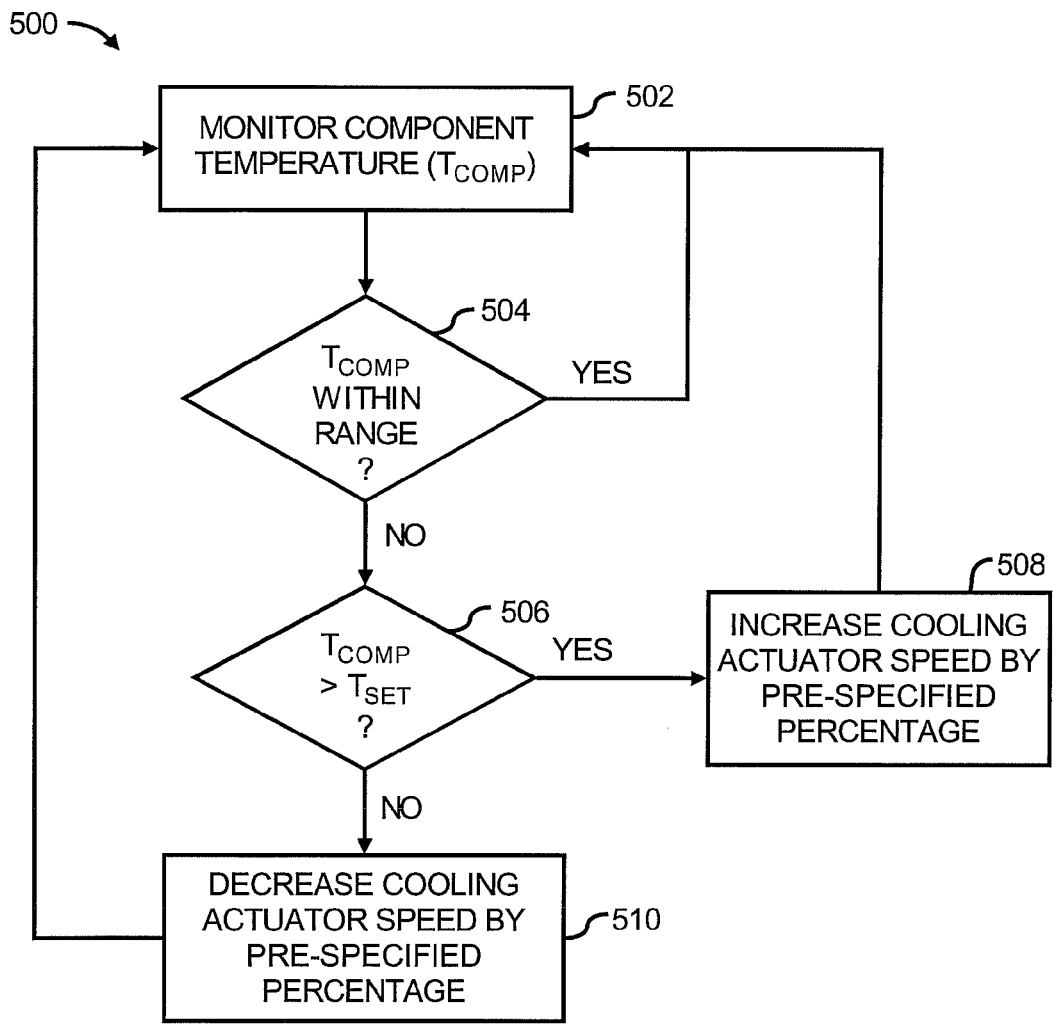
FIGS. 5A and 5B, respectively, show two flow diagrams of methods for implementing an energy optimization policy, according to an embodiment of the invention.

With reference first to FIG. 5A, the processor 102 may implement the method 500 to substantially optimize energy consumption while maintaining thermal management policies. In this regard, the processor 102 may monitor the temperatures of one or more components at step 502. The processor 102 may also determine whether the monitored temperatures of the one or more components are within a predefined range at step 504. The predefined range may comprise, for instance, a range of safe operating temperatures for the computing apparatus 100. If the processor 102 determines that the monitored temperatures are within the predefined range, the processor 102 may continue to monitor and evaluate the temperatures of the one or more components at steps 502 and 504.

If, however, the processor 102 determines that the temperatures of one or more of the components is outside of the predefined range at step 504, the processor 102 may determine whether the temperatures of the one or more components is above a set point temperature (Tset) at step 506. The set point temperature is the temperature that a component should not exceed, for instance, as indicated by the component manufacturer or through testing. If the temperatures of the one or more components is above the set point temperature, the speed of a cooling actuator 140a-140n, 142a-142n, such as, a pump, a fan may be increased by a pre-specified percentage at step 508 to attempt to reduce the temperatures of the one or more components.

If the temperatures of the one or more components are below the set point temperature, the speed of the cooling actuator 140a-140n, 142a-142n may be decreased by a pre-specified percentage at step 510. The "no" condition at step 506 indicates that the speed of the cooling actuator 140a-140n, 142a-142n may be reduced to thereby reduce energy consumption while ensuring that the components receive adequate cooling provisioning because the temperatures of the components are outside of the predefined range and below the set point temperatures.

Figure 5B:
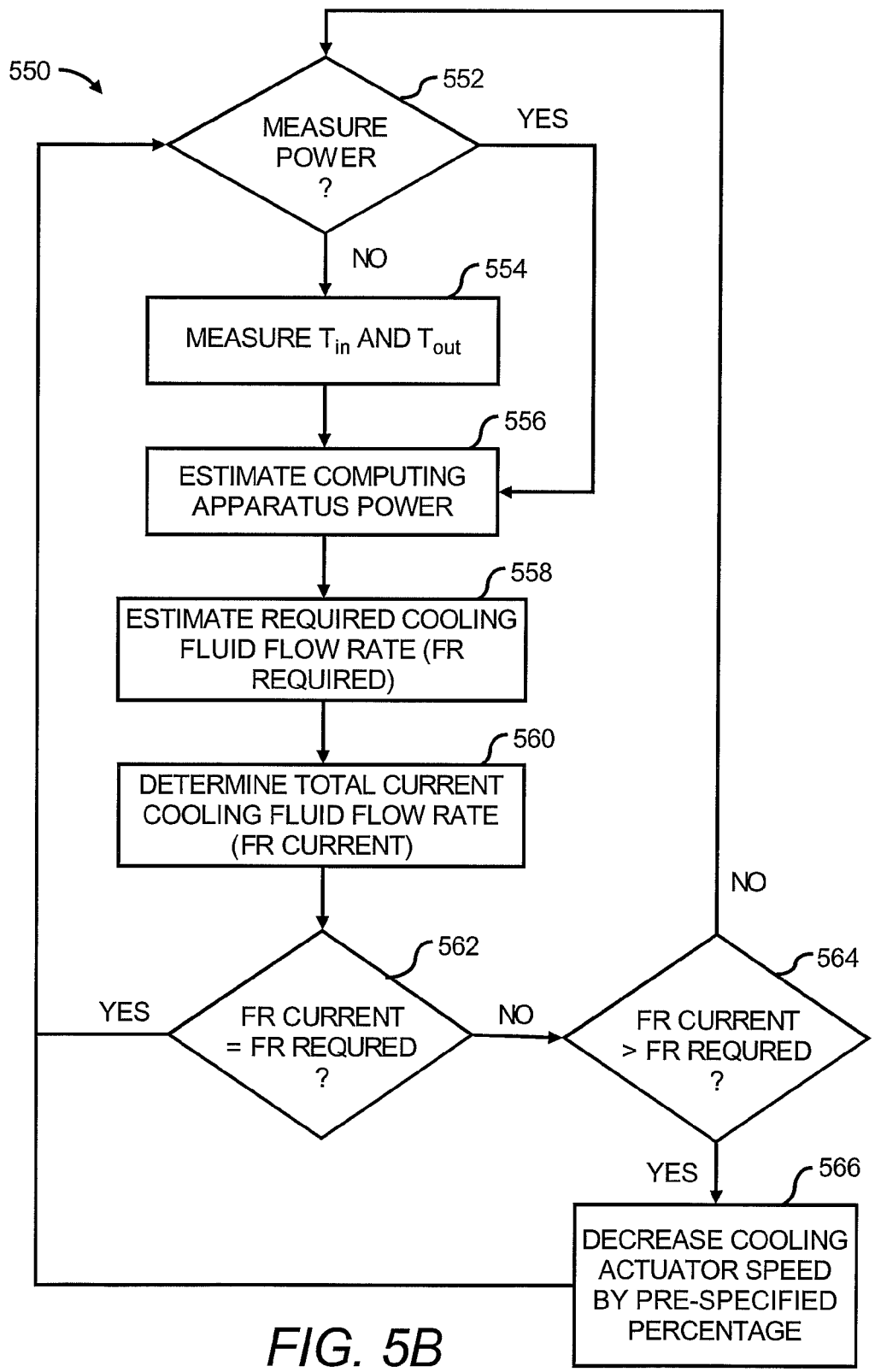

With reference now to the method 550 depicted in FIG. 5B, the processor 102 determines whether power measurements are available at step 552. If the processor 102 determines that the power measurements are available, the processor 102 may estimate the amount of power consumed by the computing apparatus 100 from the power measurements at step 556. If the processor 102 determines that power measurements are not available, the processor 102 may receive inlet and outlet temperatures at step 554 and may estimate the power consumed by the computing apparatus 100 at step 556 from the difference in temperatures.

The processor 102 may estimate the power consumed by the computing apparatus 100 at step 556 by ramping up the computing apparatus 100 cooling actuators 140a-140n, 142a-142n to their maximum levels, measuring the temperature differential between the inlet and the outlet and by estimating the power based on the known maximum cooling fluid flow rate specified by the computing apparatus 100.

At step 558, the processor 102 estimates the required amount of cooling fluid (FR Required) from each of the cooling systems based on an optimum temperature differential. At step 560, the processor 102 determines the total current cooling fluid flow rate (FR Current) of the cooling systems and at step 562, the processor 102 compares the required amount of cooling fluid to a total current cooling medium flow rate. If the processor 102 determines that the FR Current is equal to the FR Required, the processor 102 may repeat steps 552-562.

If, however, the processor 102 determines that the FR Current differs from the FR Required, the processor 102 may determine whether the FR Current exceeds the FR Required at step 564. If the processor 102 determines that the FR Current falls below the FR Required at step 564, the processor 102 may repeat steps 552-564. If the processor 102 determines that the FR Current exceeds the FR Required at step 564, the processor 102 may decrease the speed of a cooling actuator 140a-140n, 142a-142n by a pre-specified percentage at step 566. In addition, the processor 102 may continue to decrease the cooling actuator 140a-140n, 142a-142n speed until the current flow rate matches the required flow rate at step 562. In other words, because the current flow rate exceeds the required flow rate, the processor 102 may reduce the speed of the cooling actuator 140a-140n, 142a-142n to thereby reduce its energy consumption.

In an example where the performance policy has been selected, the processor 102 may attempt to maintain the temperatures of critical components to levels that substantially enhance their performance. The temperatures under this policy depend upon the type of cooling solution that are available for the components or the computing apparatus 100 in general. An example of the performance policy is depicted the flow diagram of the method 600 in FIG. 6.

Figure 6:
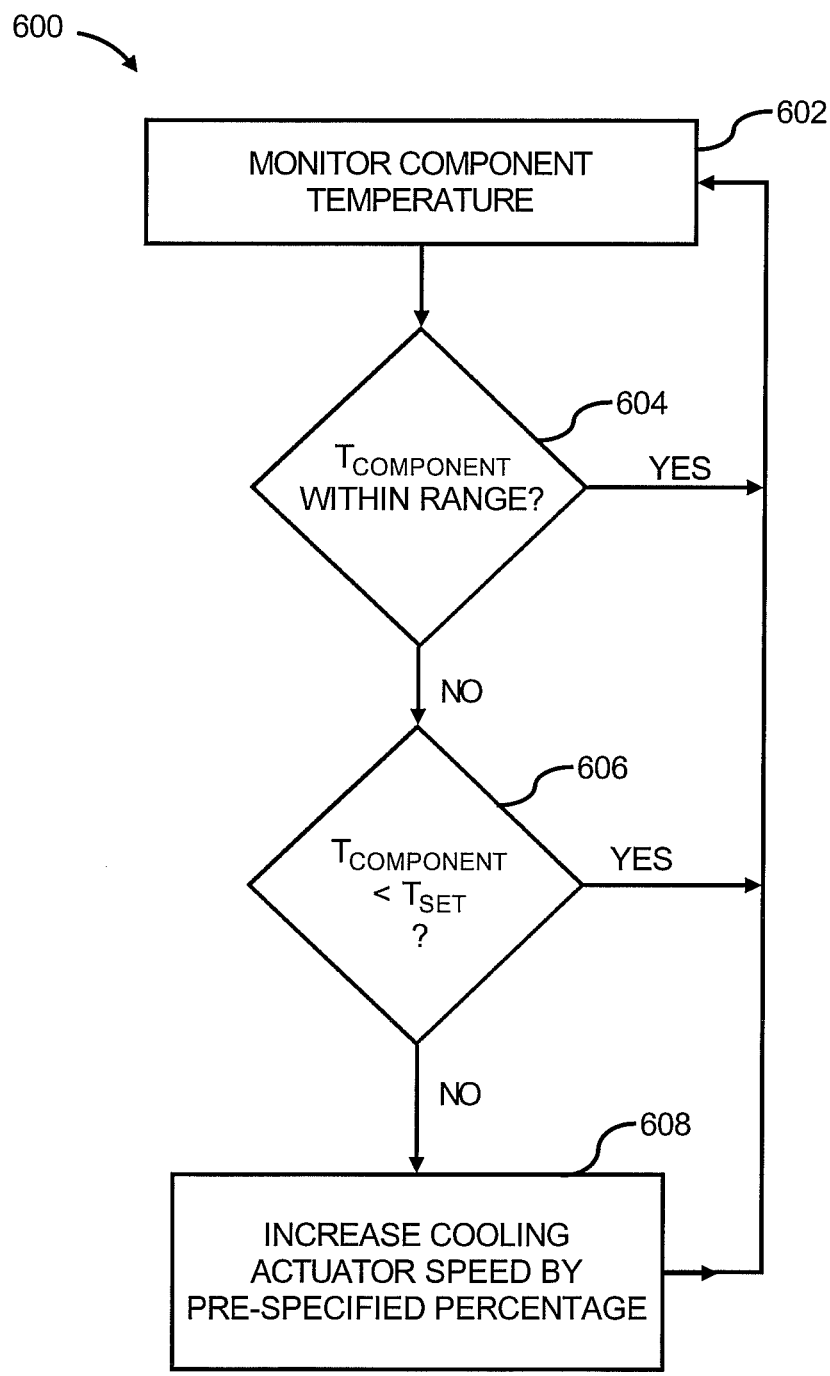
FIG. 6 shows a flow diagram of a method for implementing a performance policy, according to an embodiment of the invention.

As shown in FIG. 6, at step 602, the processor 102 monitors a temperature of a component, such as, the processor 102 itself, a graphics card, or another processing device in the computing apparatus 100. At step 604, the processor 102 determines whether the temperature of the component is within a predefined temperature range. The predefined temperature range may include, for instance, a range of safe operational temperatures for the component. If the processor 102 determines that the temperature of the component is within the predefined range, the processor 102 may continue to monitor the temperature of the component at step 602 and may repeat step 604.

If, however, the processor 102 determines that the temperature of the component is outside of the predefined range, the processor 102 may determine whether the temperature of the component is below a set point temperature at step 606. The set point temperature is the temperature that a component should not exceed, for instance, as indicated by the component manufacturer or through testing.

If the processor 102 determines that the temperature of the component is below the supply air temperature at step 606, the processor 102 may continue monitoring the component temperature at step 602 and may repeat steps 604 and 606. If, however, the processor 102 determines that the temperature of the component exceeds the supply air temperature at step 606, the processor 102 may increase the speed of a cooling actuator 140a-140n, 142a-142n by a pre-specified percentage at step 608. The processor 102 may continue to implement steps 602-608 until the temperature of the component is reduced to be within the predefined range at step 604. In this regard, the processor 102 may cause the cooling actuator 140a-140n, 142a-142n to run at relatively high levels to provide the desired level of cooling without regard to the amount of energy being consumed by the cooling actuator 140a-140n, 142a-142n. As such, the components may be run at relatively high levels while receiving adequate cooling provisioning.

In another example where the performance policy has been selected, the processor 102 may reduce the temperature of a component, such as, a CPU, a graphics card, etc., to a level where the frequency of the component is increased, such that the component operates in an over-clocked state. The minimum temperature depends on the type of cooling solution available and may thus be available through, for instance, liquid cooled or refrigerated cooling systems. In any regard, an example of the performance policy is depicted the flow diagram of the method 700 in FIG. 7.

Figure 7:
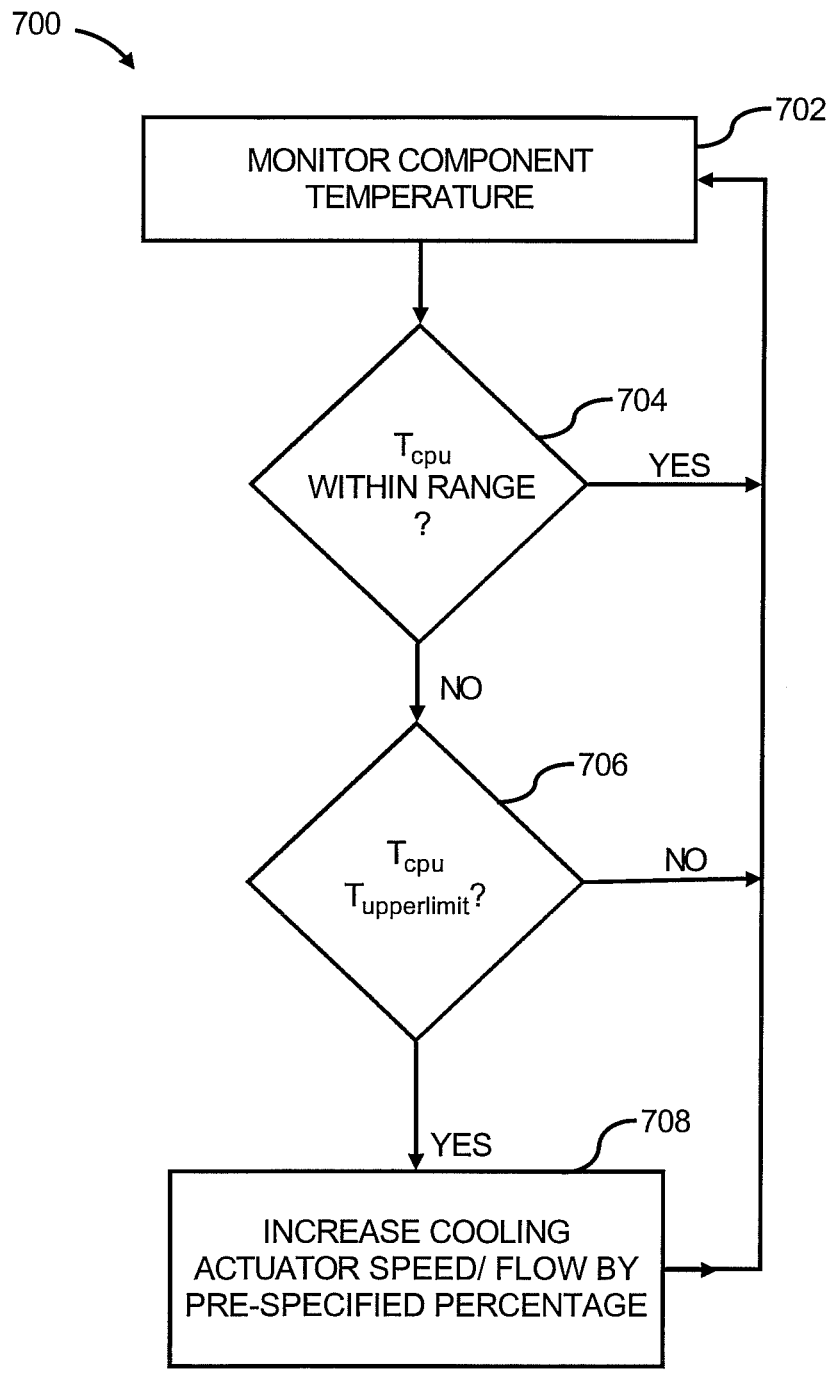
FIG. 7 shows a flow diagram of a method for implementing a performance policy, according to another embodiment of the invention.

As shown in FIG. 7, at step 702, the processor 102 monitors a temperature of a component, such as, a CPU, the processor 102 itself, a graphics card, or another processing device in the computing apparatus 100. At step 704, the processor 102 determines whether the temperature of the component is within a predefined temperature range. The predefined temperature range may include, for instance, a range of safe operational temperatures for the component. Alternatively, however, the predefined temperature range may include a reduced temperature range that causes the frequency of the component to become increased.

If the processor 102 determines that the temperature of the component is within the predefined range, the processor 102 may continue to monitor the temperature of the component at step 702 and may repeat step 704. If, however, the processor 102 determines that the temperature of the component is outside of the predefined range, the processor 102 may determine whether the temperature of the component is above an upper limit temperature at step 706. The upper limit temperature may comprise, for instance, the temperature at which the component no longer has an increased frequency level.

If the processor 102 determines that the temperature of the component is below the upper limit temperature at step 706, the processor 102 may continue monitoring the component temperature at step 702 and may repeat steps 704 and 706. If, however, the processor 102 determines that the temperature of the component exceeds the upper limit temperature at step 706, the processor 102 may increase the speed of a cooling actuator 140a-140n, 142a-142n by a pre-specified percentage at step 708. The processor 102 may continue to implement steps 702-708 until the temperature of the component is reduced to be within the predefined range at step 704. In this regard, the processor 102 may cause the cooling actuator 140a-140n, 142a-142n to run at relatively high levels to provide the cooling levels that cause the component to over-clock without regard to the amount of energy being consumed by the cooling actuator 140a-140n, 142a-142n. As such, the components may be run at relatively high levels while receiving adequate cooling provisioning.

In a further example where the sustainability policy has been selected, the processor 102 attempts to predict and prevent component failures and thus enhance system reliability. According to an example, the processor 102 attempts to prevent the computing apparatus 100 from vibrating at a disk drive's natural frequency, which is known to result in severe performance degradation. An example of this sustainability policy is depicted the flow diagram of the method 800 in FIG. 8.

Figure 8:
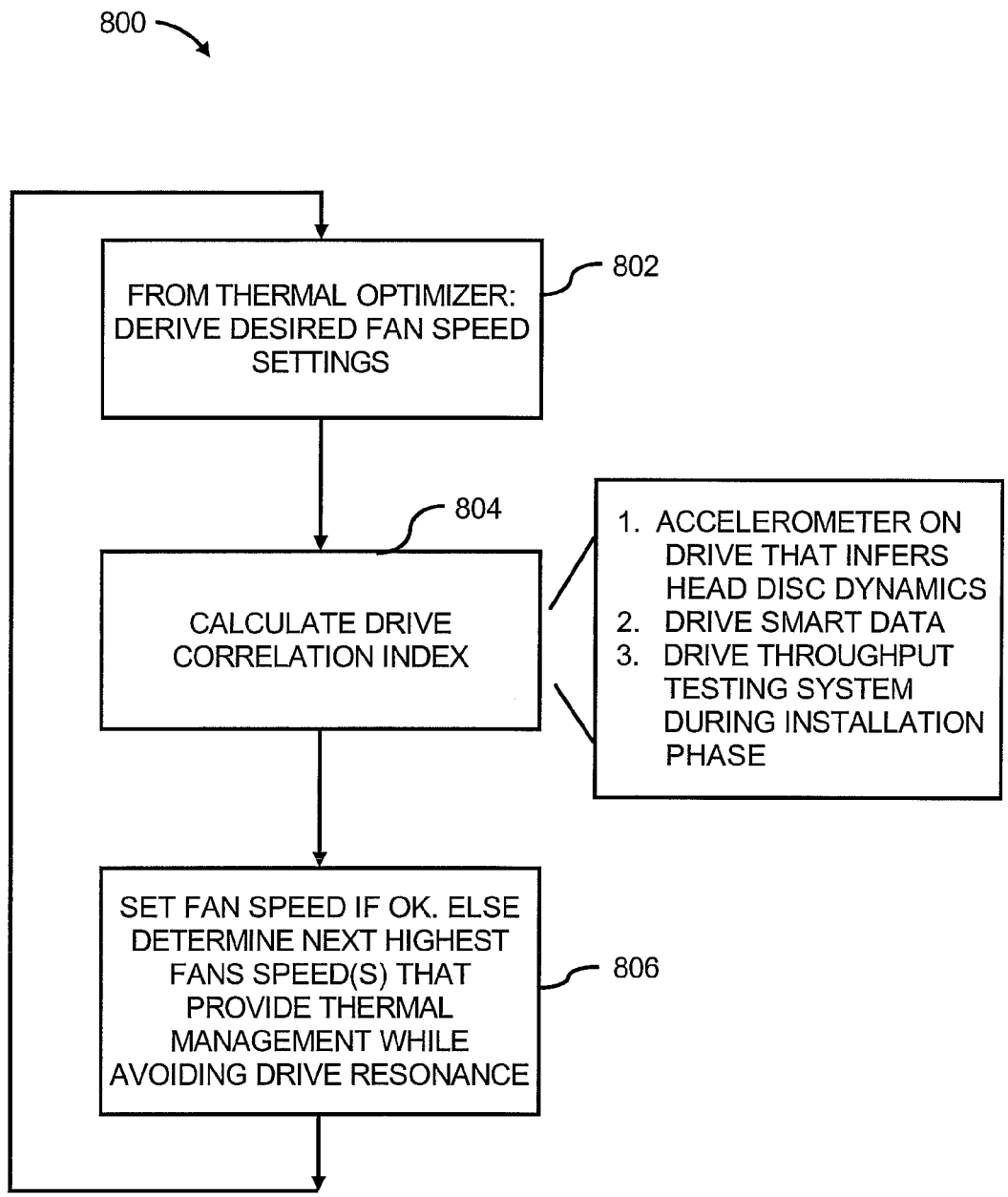
FIG. 8 shows a flow diagram of a method for implementing a sustainability policy, according to an embodiment of the invention.

As shown in FIG. 8, at step 802, the processor 102 may receive desired settings of cooling actuators 140a-140n, 142a-142n, such as fans, in the computing apparatus 100. By way of example, the settings may be based upon the thermal management policies described with respect to the methods 500 and 550 in FIGS. 5A and 5B.

In any regard, at step 804, the processor 102 may calculate a drive correlation index (DCI), which correlates an amplitude of a drive displacement with a fan rotational frequency. As shown in FIG. 8, the DCI may be calculated through use of an accelerometer that infers head disk dynamics, through drive "smart" data, or through a drive throughput testing system during an installation stage. More particularly, for instance, a test may be developed for use during the disk drive installation process that examines drive throughput for give fan rotation and determines the coupling if the performance falls below a threshold value. In addition, or alternatively, a test for the disk drives may be built-in to the drives as part of a "smart" standard set used by a drive manufacturer to enable drive excitation information to be available without requiring an external sensor.

In any regard, at step 806, the DCI is compared to a given threshold and fan rotational speeds that are likely to cause problems in the disk drive are deallocated from the set of speeds determined at step 802. However, if the processor 102 determines that the selected fan speed setting at step 802 is likely to cause problems, the fan speed setting is increased, for instance, by 50 RPM to therefore provide adequate cooling while ensuring that the fan does not resonate at the disk drive's natural frequency.

A more detailed description of DCI and various manners in which a disk drive may be decoupled from a rotational frequency of a fan is described in greater detail in copending and commonly assigned U.S. patent application Ser. No. 11/784, 620, filed on Apr. 9, 2007, by Ratnesh Sharma et al., the disclosure of which is hereby incorporated by reference in its entirety.

As another example where the sustainability policy has been selected, the processor 102 attempts to identify when the computing apparatus 100 is tilted and whether the angle at which the computing apparatus 100 is tilted is likely to affect operations in the computing apparatus 100. More particularly, for instance, some cooling systems, such as, passive thermosyphons, require that they be oriented such that the solution condenser is above the evaporator to enable gravity aided flow. As such, it may be important in certain cooling system configurations to identify when the computing apparatus 100 has become titled and to correct for the tilting to thereby enable proper cooling system operations. An example of this sustainability policy is depicted the flow diagram of the method 900 in FIG. 9.

Figure 9:
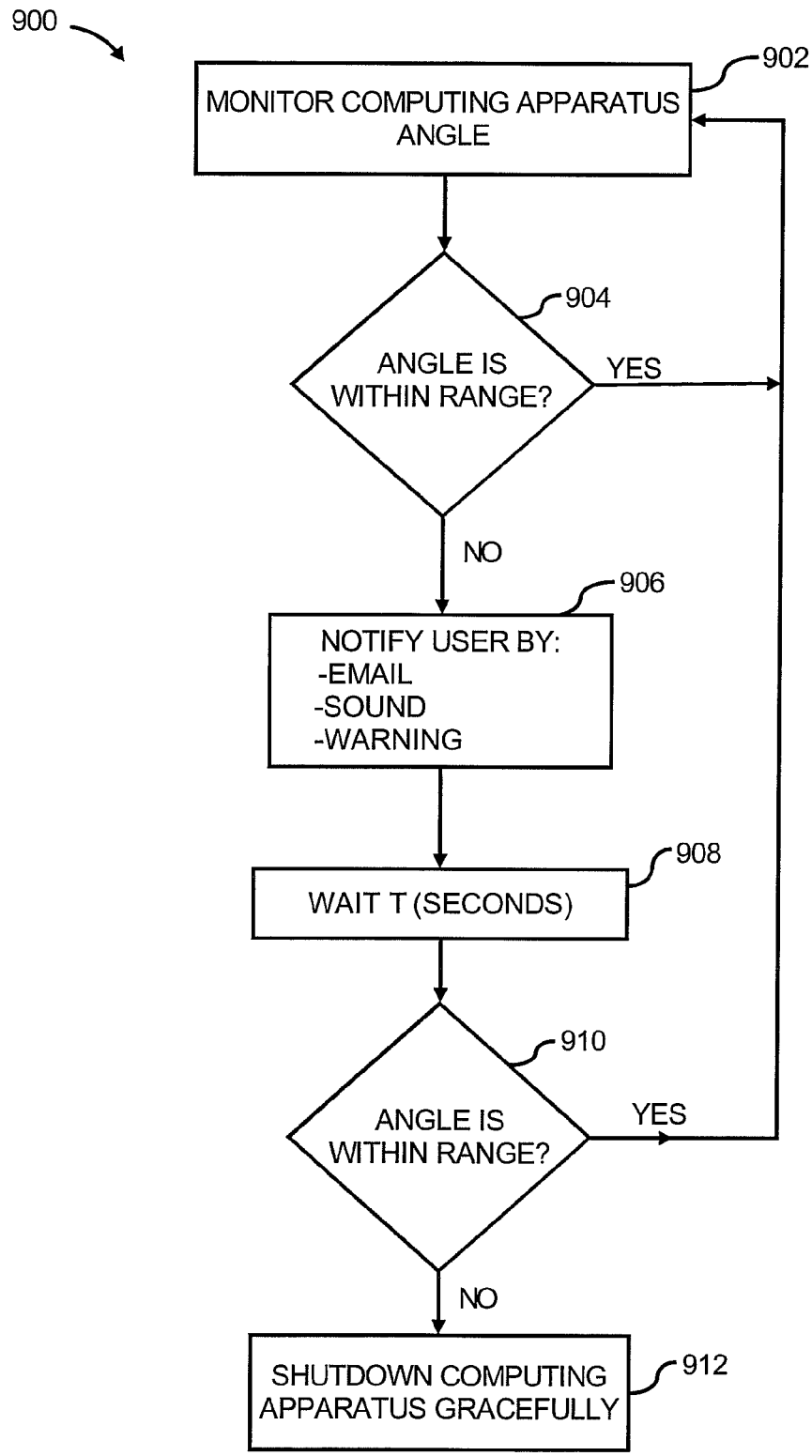
FIG. 9 shows a flow diagram of a method for implementing a sustainability policy, according to another embodiment of the invention.

As shown in FIG. 9, at step 902, the processor 102 monitors the angle of the computing apparatus 100 through receipt of input from, for instance, one or more accelerometers. At step 904, the processor 102 determines whether the monitored angle is within a predetermined range. The predetermined range may include a range of angles that the computing apparatus 100 may be positioned within while operating properly.

If the processor 102 determines that the monitored angle is outside of the predetermined angle, the processor 102 may repeat steps 902 and 904 to continuously determine whether the computing apparatus 100 is at an appropriate angle. However, if the processor 102 determines that the monitored angle is outside of the predetermined angle at step 904, the processor 102 may notify a user that the computing apparatus is tilted beyond a predetermined angle at step 906. More particularly, the processor 102 may notify the user via email, an audible or visible warning, etc.

At step 908, the processor 102 may again monitor the angle of the computing apparatus 100 after waiting for a predetermined amount of time. In addition, at step 910, the processor 102 may again determine whether the monitored angle is within the predetermined angle. In other words, at step 910, the processor 102 determines whether the tilt of the computing apparatus 100 has been corrected.

If the processor 102 determines that the monitored angle is within the predetermined angle range, the processor 102 may continue to monitor the computing apparatus angle at step 902 and may repeat steps 904-910. If, however, the processor 102 determines that the monitored angle is not within the predetermined range at step 910, the processor 102 gracefully shuts down the computing apparatus 100 at step 912. More particularly, for instance, the processor 102 automatically stores any pending data that is active and initiates a shutdown operation to substantially prevent harmful effects caused by inadequate cooling in the computing apparatus 100.

In an example where the warranty and maintenance policy has been selected, the processor 102 is provided with sufficient data storage capacity to store data received from the sensors 130a-130n, 132a-132n for a specified period of time. The processor 102 may store this information in the storage interface 118, which may comprise a non-volatile storage device configured to store relatively recent information. In one regard, the processor 102 may implement the storage interface 118 in a manner similar to that of the "black box" in airplanes. This information may be used by technicians in identifying the causes of problems. An example of the warranty and maintenance policy is depicted in the flow diagram of the method 1000 in FIG. 10.

Figure 10:
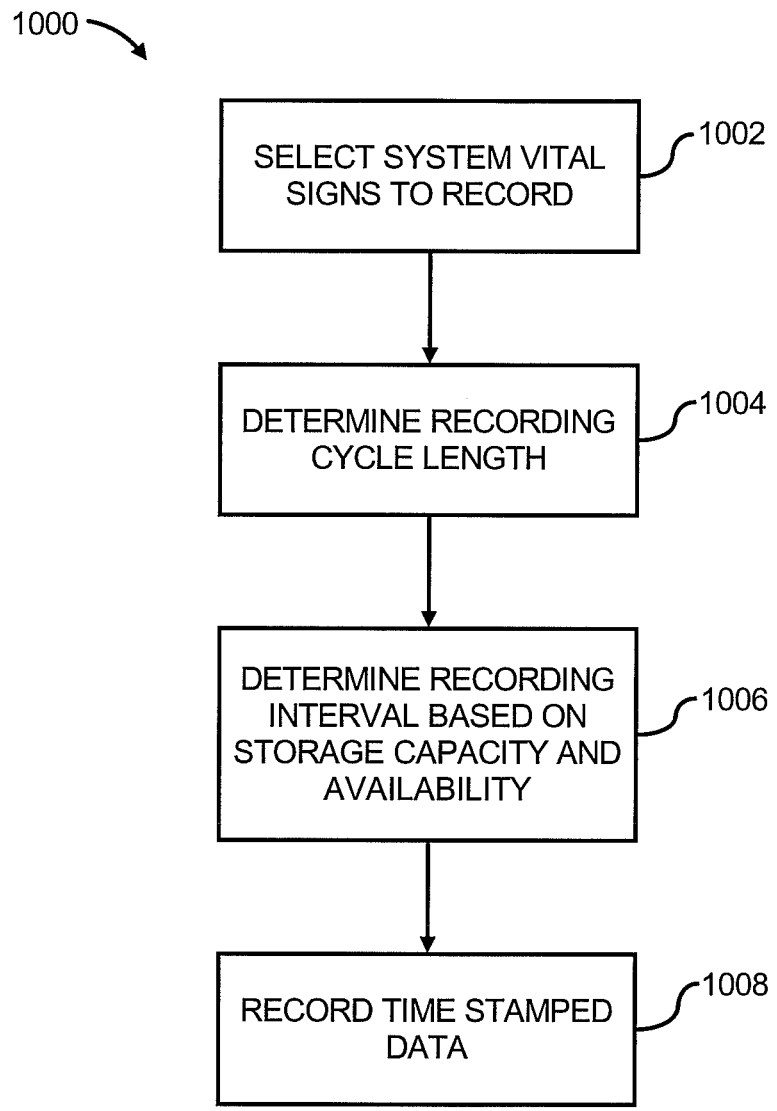
FIG. 10 shows a flow diagram of a method for implementing a warranty and maintenance policy, according to an embodiment of the invention.

As shown in FIG. 10, at step 1002 the processor 102 selects which of the inputs received from the sensors 130a-130n are to be recorded. The inputs may be selected according to, for instance, the relative effects the conditions the sensors 130a-130n, 132a-132n that detected the inputs have on the computing apparatus 100. For instance, information pertaining to the temperature of the computing apparatus 100 may be selected as well as processor utilization levels.

In any regard, at step 1004, the processor 102 may determine a recording cycle length. The recording cycle length generally defines the minimum amount of data that is recorded before new data is recorded over the oldest data. The recording cycle length may be determined by a system designer and may depend upon the available storage capacity, the level of system criticality, the minimum data size needed for adequate analysis, the frequency and the number of data points recorded, etc. In addition, at step 1006, the processor 102 may determine a recording interval based upon the capacity and availability of the storage device on which the inputted data is stored. The recording interval may define the times at which the data is recorded.

At step 1008, the processor 102 may record a time stamped version of the data in the storage device.

The operations set forth in the methods 400, 500, 550, and 600-1000 may be contained as at least one utility, program, or subprogram, in any desired computer accessible medium. In addition, the methods 400, 500, 550, and 600-1000 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for controlling a computing apparatus having a plurality of sensors and a plurality of actuators, said computing apparatus being configured to operate under multiple operational policies, said method comprising:

determining a level of influence the plurality of actuators has over the plurality of sensors to obtain a correlation between the plurality of sensors and the plurality of actuators;

selecting an operational policy of the multiple operational policies to implement;

receiving inputs from the plurality of sensors;

analyzing the inputs from the plurality of sensors to identify at least one of the plurality of actuators to be manipulated based upon the correlation and a selected operational policy to implement, wherein analyzing the inputs further comprises analyzing the inputs to determine how the identified at least one of the plurality of actuators is to be manipulated to substantially optimize energy consumption of the computing apparatus while maintaining the computing apparatus within a predefined temperature range in response to selection of an energy optimization policy by:

determining whether a temperature of the computing apparatus is within the predefined temperature range;

in response to the temperature of the computing apparatus being outside the predefined temperature range, determining whether the temperature of the computing apparatus is higher than a maximum operational temperature; and in response to the temperature of the computing apparatus being above the maximum operational temperature, increase a speed of a cooling actuator; and manipulating the identified at least one of the plurality of actuators based upon a selected operational policy.

2. The method according to claim 1, wherein the multiple operational policies further include a thermal management policy, a performance policy, a sustainability policy, and a warranty and maintenance policy, wherein each of the different operational policies has a different objective, and wherein analyzing the inputs further comprises analyzing the inputs to identify how at least one of the plurality of actuators is to be manipulated to achieve one or more objectives one or more operational policies.

3. The method according to claim 2, wherein the at least one of the plurality of actuators comprises a fan, and wherein analyzing the inputs further comprises analyzing the inputs to determine whether a vibrational frequency of the fan is near a natural resonance frequency of a disk drive, and wherein manipulating the identified at least one of the plurality of actuators further comprises increasing the speed of the fan in response to the vibrational frequency of the fan being near the natural resonance frequency of the disk drive, when the sustainability policy is selected.

4. The method according to claim 2, wherein at least one of the plurality of sensors comprises an accelerometer and at least one of the plurality of actuators comprises a notification device, wherein analyzing the inputs further comprises analyzing the inputs to determine whether the computing apparatus is tilted beyond a predetermined angle, and wherein manipulating the identified at least one of the plurality of actuators further comprises activating the notification device in response to the computing apparatus being tilted beyond the predetermined angle.

5. The method according to claim 1, further comprising:
collecting data pertaining to operations of one or more of the plurality of actuators; and
storing the data in response to a warranty and maintenance policy being selected.

6. The method according to claim 1, wherein selecting an operational policy to implement further comprises at least one of automatically selecting an operational policy based upon an operational characteristic of the computing apparatus and receiving an instruction indicating which of the multiple operational policies to implement.

7. The method according to claim 1, wherein selecting an operational policy of the multiple policies to implement further comprises selecting a plurality of operational policies to implement, wherein analyzing the inputs further comprises analyzing the inputs from the plurality of sensors to identify at least one of the plurality of actuators to be manipulated based upon the correlation and the selected plurality of operational policies to implement, and wherein manipulating the identified at least one of the plurality of actuators further comprises manipulating the identified at least one of the plurality of actuators based upon the selected plurality of operational policies.

8. The method according to claim 7, wherein analyzing the inputs further comprises analyzing the inputs to identify how the identified at least one of the plurality of actuators is to be manipulated to substantially optimize the selected plurality of operational policies.

9. The method according to claim 1, wherein determining the level of influence the plurality of actuators has over the plurality of sensors comprises determining the level of influence each of the plurality of actuators has over each of the plurality of sensors.

10. A computing apparatus configured to operate under multiple operational policies, said computing device comprising:
a plurality of sensors;
a plurality of actuators;
a memory that stores code for the multiple operational polices; and
a processor programmed and configured to receive inputs from the plurality of sensors, to determine a level of influence the plurality of actuators have over the plurality of sensors to obtain a correlation between the plurality of sensors and the plurality of actuators, to implement a selected operational policy of the multiple operational policies, to analyze the inputs from the plurality of sensors to thereby identify at least one of the plurality of actuators to be manipulated based upon the correlation and a selected operational policy to implement, and to manipulate the identified at least one of the plurality of actuators based upon a selected operational policy,
wherein the processor is further programmed and configured to analyze the inputs to determine how the identified at least one of the plurality of actuators is to be manipulated to substantially optimize energy consumption of the computing apparatus while maintaining the computing apparatus within a predefined temperature range in response to selection of an energy optimization policy by:
determining whether a temperature of the computing apparatus is within the predefined temperature range;
in response to the temperature of the computing apparatus being outside the predefined temperature range, determining whether the temperature of the computing apparatus is higher than a maximum operational temperature; and
in response to the temperature of the computing apparatus being above the maximum operational temperature, increase a speed of a cooling actuator.

11. The computing apparatus according to claim 10, further comprising:
a motherboard, wherein the processor is one of a central processing unit of the motherboard and an add-on processing unit separate from a central processing unit of the computing apparatus.

12. The computing apparatus according to claim 11, wherein at least one of the plurality of sensors comprises a sensor integrated with the motherboard and wherein at least one of the plurality of sensors comprises an add-on sensor with respect to the motherboard.

13. The computing apparatus according to claim 11, wherein at least one of the plurality of actuators comprises an actuator integrated with the motherboard and wherein at least one of the plurality of actuators comprises an add-on actuator with respect to the motherboard.

14. The computing apparatus according claim 11, wherein the plurality of sensors comprise at least some of a power sensor, a fan speed sensor, a rotational frequency sensor, a temperature sensor, a workload utilization sensor, a temperature difference sensor, a pressure difference sensor, an acoustic sensor, an orientation angle sensor, and a flow rate sensor.

15. The computing apparatus according to claim 11, wherein the multiple operational policies further include a thermal management policy, a performance policy, and a sustainability policy, wherein each of the different operational policies has a different objective.

16. The computing apparatus according to claim 15, wherein the processor is further configured to switch implementing between the multiple operational policies.

17. The computing apparatus according to claim 15, further comprising:

a plurality of heat generating components;

wherein at least one of the actuators comprises a system for cooling the plurality of heat generating components, wherein the processor is further configured to operate the system for cooling the plurality of heat generating components to substantially ensure that the plurality of heat generating components receive adequate cooling provisioning when the processor implements the thermal management policy.

18. The computing apparatus according to claim 15, wherein the processor is configured to implement a plurality of selected operational policies.

19. A non-transitory computer readable storage medium on which is embedded one or more computer programs, said one or more computer programs implementing a method for controlling a computing apparatus having a plurality of sensors and a plurality of actuators, said computing apparatus being configured to operate under multiple operational policies, said one or more computer programs comprising a set of instructions for:

determining a level of influence the plurality of actuators has over the plurality of sensors to obtain a correlation between the plurality of sensors and the plurality of actuators;

selecting an operational policy of the multiple policies to implement;

receiving input from the plurality of sensors;

analyzing the inputs from the plurality of sensors to identify at least one of the plurality of actuators to be manipulated based upon the correlation and a selected operational policy to implement, wherein analyzing the inputs further comprises analyzing the inputs to determine how the identified at least one of the plurality of actuators is to be manipulated to substantially optimize energy consumption of the computing apparatus while maintaining the computing apparatus within a predefined temperature range in response to selection of an energy optimization policy by:

determining whether a temperature of the computing apparatus is within the predefined temperature range;

in response to the temperature of the computing apparatus being outside the predefined temperature range, determining whether the temperature of the computing apparatus is higher than a maximum operational temperature; and in response to the temperature of the computing apparatus being above the maximum operational temperature, increase a speed of a cooling actuator; and manipulating the identified at least one of the plurality of actuators based upon a selected operational policy.

\* \* \* \* \*